United States Patent
Choi et al.

(10) Patent No.: US 10,386,987 B2
(45) Date of Patent: Aug. 20, 2019

(54) REMOTE CONTROLLER APPARATUS AND CONTROL METHOD THEREOF

(71) Applicant: SAMSUNG ELECTRONICS CO., LTD., Suwon-si (KR)

(72) Inventors: Jung-hyun Choi, Seoul (KR); Yong-hoon Choi, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 733 days.

(21) Appl. No.: 14/884,212

(22) Filed: Oct. 15, 2015

(65) Prior Publication Data
US 2016/0110057 A1 Apr. 21, 2016

(30) Foreign Application Priority Data
Oct. 15, 2014 (KR) .................. 10-2014-0139052

(51) Int. Cl.
*G06F 3/0481* (2013.01)
*G06F 3/0346* (2013.01)
(Continued)

(52) U.S. Cl.
CPC ........ *G06F 3/04812* (2013.01); *G06F 3/0346* (2013.01); *G06F 3/0354* (2013.01);
(Continued)

(58) Field of Classification Search
CPC .. G06F 3/04812; G06F 3/0485; G06F 3/0362; G06F 3/0487; G06F 3/0354;
(Continued)

(56) References Cited

U.S. PATENT DOCUMENTS

| 7,239,302 B2 | 7/2007 | Kim |
| 8,471,870 B2 | 6/2013 | Stringer et al. |

(Continued)

FOREIGN PATENT DOCUMENTS

| CN | 1495665 A | 5/2004 |
| CN | 102420950 A | 4/2012 |

(Continued)

OTHER PUBLICATIONS

Communication dated Jan. 4, 2018 by the State Intellectual Property Office of P.R. China in counterpart Chinese Patent Application No. 201510671181.5.
(Continued)

*Primary Examiner* — Aneeta Yodichkas
(74) *Attorney, Agent, or Firm* — Sughrue Mion, PLLC

(57) ABSTRACT

A remote controller apparatus including: a communicator configured to communicate with an external device displaying a pointing object thereon; a sensor configured to sense a movement of the remote controller apparatus; and a controller configured to control movement of the pointing object based on the movement of the remote controller apparatus, determine position information corresponding to the movement of the remote controller apparatus with a first method when the remote controller apparatus operates in a first operating mode, determine the position information corresponding to the movement of the remote controller apparatus with a second method when the remote controller apparatus operates in a second operating mode, control the movement of the pointing object based on the position information, and change the operating mode of the remote controller apparatus in response to a preset event occurring.

15 Claims, 11 Drawing Sheets

(51) Int. Cl.

| | |
|---|---|
| *G06F 3/0354* | (2013.01) |
| *G06F 3/0362* | (2013.01) |
| *G06F 3/0485* | (2013.01) |
| *G06F 3/0487* | (2013.01) |
| *G08C 17/00* | (2006.01) |
| *H04N 21/422* | (2011.01) |
| *H04N 5/44* | (2011.01) |

(52) U.S. Cl.
CPC .......... *G06F 3/0362* (2013.01); *G06F 3/0485* (2013.01); *G06F 3/0487* (2013.01); *G08C 17/00* (2013.01); *H04N 5/4403* (2013.01); *H04N 21/42202* (2013.01); *H04N 21/42222* (2013.01); *G08C 2201/32* (2013.01); *H04N 2005/4407* (2013.01); *H04N 2005/4428* (2013.01)

(58) Field of Classification Search
CPC ............ G06F 3/0346; H04N 21/42202; H04N 5/4403; H04N 21/42222; H04N 2005/4407; H04N 2005/4428; G08C 17/00; G08C 2201/32
See application file for complete search history.

(56) References Cited

U.S. PATENT DOCUMENTS

| | | | |
|---|---|---|---|
| 9,256,345 | B2 | 2/2016 | Lee et al. |
| 2004/0041798 | A1 | 3/2004 | Kim |
| 2007/0022391 | A1 | 1/2007 | Kim et al. |
| 2009/0303184 | A1 | 12/2009 | Tao et al. |
| 2011/0004887 | A1 | 1/2011 | Stringer et al. |
| 2011/0169734 | A1* | 7/2011 | Cho ..................... G06F 3/0346 345/157 |
| 2012/0062457 | A1 | 3/2012 | Lee et al. |
| 2012/0212678 | A1 | 8/2012 | Wang |
| 2013/0128127 | A1 | 5/2013 | Xu et al. |
| 2013/0342454 | A1 | 12/2013 | Choi et al. |
| 2013/0342455 | A1 | 12/2013 | Choi et al. |
| 2014/0196086 | A1 | 7/2014 | Liang et al. |
| 2014/0198044 | A1 | 7/2014 | Wang et al. |
| 2014/0240608 | A1 | 8/2014 | Choi et al. |

FOREIGN PATENT DOCUMENTS

| | | |
|---|---|---|
| CN | 102576296 A | 7/2012 |
| CN | 102622106 A | 8/2012 |
| CN | 102955650 A | 3/2013 |
| EP | 2 428 875 A2 | 3/2012 |
| EP | 2 474 893 A1 | 7/2012 |
| JP | 4011987 B2 | 11/2007 |
| KR | 10-2012-0026905 A | 3/2012 |
| KR | 10-1237397 B1 | 2/2013 |
| RU | 2 103 723 C1 | 1/1998 |
| TW | 200951775 A | 12/2009 |
| WO | 2009/032898 A2 | 3/2009 |
| WO | 2011/087250 A2 | 7/2011 |

OTHER PUBLICATIONS

Communication dated Feb. 16, 2018 by the European Patent Office in counterpart European Patent Application No. 15189406.0.
Communication dated Mar. 11, 2016 issued by European Patent Office in counterpart European Patent Application No. 15189406.0.
International Search Report dated Feb. 15, 2016 issued by International Searching Authority in counterpart International Application No. PCT/KR2015/010819 (PCT/ISA/210).
Written Opinion dated Feb. 15, 2016 issued by International Searching Authority in counterpart International Application No. PCT/KR2015/010819 (PCT/ISA/237).
Communication dated Nov. 14, 2018, issued by the State Intellectual Property Office of People's Republic of China in counterpart Chinese Application No. 201510671181.5.
Communication dated May 17, 2019, issued by the Russian Patent Office in counterpart Russian Application No. 2017107202.
Communication dated Jun. 4, 2019, issued by the Chinese Patent Office in counterpart Chinese Application No. 201510671181.5.

* cited by examiner

500

600

800

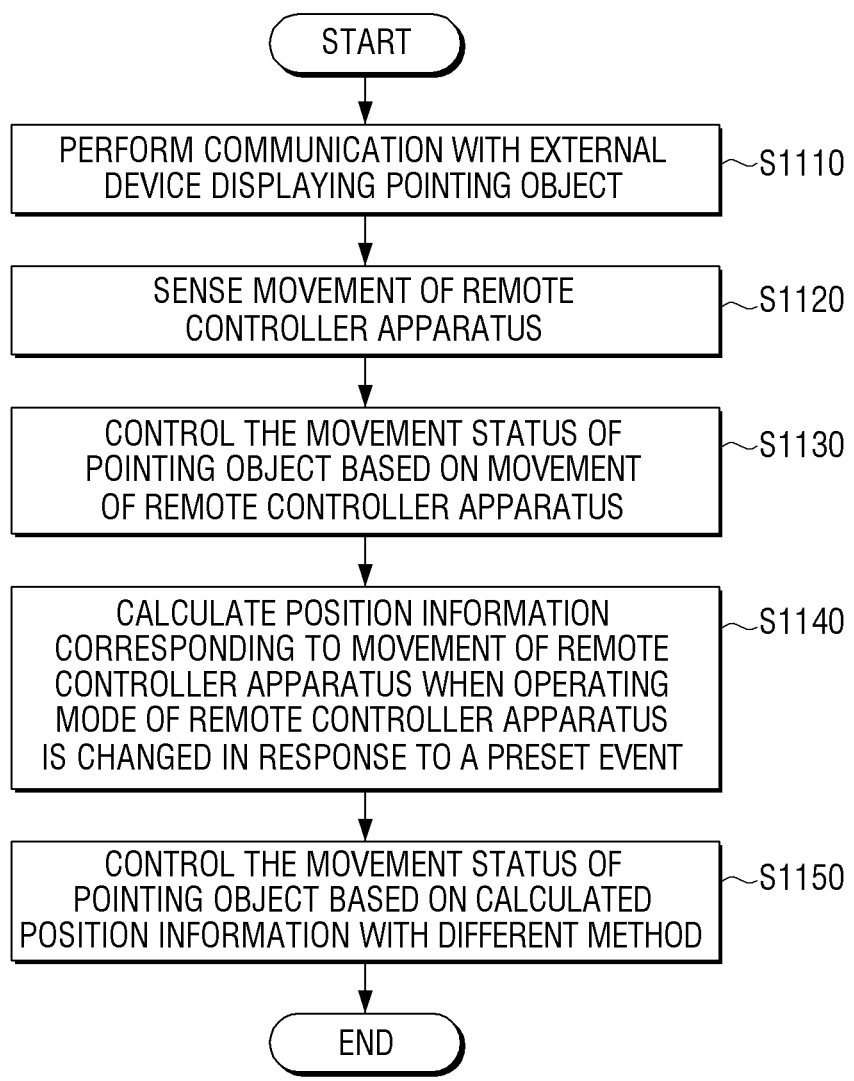

REMOTE CONTROLLER APPARATUS AND CONTROL METHOD THEREOF

CROSS-REFERENCE TO RELATED APPLICATIONS

This application claims priority from Korean Patent Application No. 10-2014-0139052, filed on Oct. 15, 2014 in the Korean Intellectual Property Office, the disclosure of which is incorporated herein by reference in its entirety.

BACKGROUND

1. Field

Apparatuses and methods consistent with exemplary embodiments relate to a display apparatus and a control method thereof, and more specifically, to a remote controller apparatus which changes operating modes and a control method thereof.

2. Description of the Related Art

Various display apparatuses such as televisions (TVs), mobile phones, personal computers (PCs), laptop PCs, and personal digital assistants (PDAs) are frequently used in many households.

As the use of display apparatuses has increased, a need for the display apparatuses to perform various functions has also expanded. Manufacturers increased efforts to meet these needs have led to the emergence of products having new functions that are not provided in a related art.

In particular, a remote controller apparatus has an increased number of functions to control the display apparatuses in order to support the new functions of the display apparatus. Such remote controller apparatus may be implemented as a mouse and a pointing device.

However, the mouse and the pointing device have independent platforms and operating methods, and the serviceable functions of these two devices are distinct from each other.

Accordingly, inconvenience arises, as the type of the remote controller apparatus has to be changed according to use environment necessary for controlling various display apparatuses.

SUMMARY

One or more exemplary embodiments overcome the above disadvantages and other disadvantages not described above. Also, one or more exemplary embodiments are not required to overcome the disadvantages described above, and an exemplary embodiment may not overcome any of the problems described above.

According to one or exemplary embodiments, there is provided a remote controller apparatus configured to change pointing methods when an operating mode is changed according to use environment and a control method thereof.

In one exemplary embodiment, there is provided a remote controller apparatus configured to support a plurality of operating modes, the remote controller apparatus including: a communicator configured to communicate with an external device displaying a pointing object thereon; a sensor configured to sense a movement of the remote controller apparatus; and a controller configured to control movement of the pointing object based on the movement of the remote controller apparatus, determine position information corresponding to the movement of the remote controller apparatus using a first method when the remote controller apparatus operates in a first operating mode of the plurality of operating modes, determine the position information corresponding to the movement of the remote controller apparatus using a second method when the remote controller apparatus operates in a second operating mode of the plurality of operating modes, control the movement of the pointing object based on the position information, and change the operating mode of the remote controller apparatus in response to a preset event occurring.

The preset event may include at least one of an event in which a tilting degree of the remote controller apparatus is changed and an event in which an infrared light emitted from an infrared sensor provided on the remote controller apparatus is not sensed by the infrared sensor.

The first method is an absolute coordinate method and the second method is a relative coordinate method, and the absolute coordinate method may include determining coordinates corresponding to the position of the pointing object based on mapped coordinates on a screen provided on the external device, and the relative coordinate method may include determining an amount of the motion of the pointing object based on a current position of the pointing object.

The first operating mode may be a pointing device mode, and the controller may be further configured to control the movement of the pointing object so that the pointing object is moved to one of the mapped coordinates on the screen when the remote controller apparatus operates in the pointing device mode.

The second operating mode may be a mouse device mode, and the controller may be further configured to control the movement of the pointing object according to an amount of the motion of the remote controller apparatus corresponding to the position information when the remote controller apparatus operates in the mouse device mode.

The controller may be further configured to generate a control signal to perform a preset function and control the communicator to transmit the control signal to the external device when the pointing object is moved to coordinates outside the mapped coordinates on the screen.

The remote controller apparatus may further include a wheel button configured to be rotatable.

The controller may be further configured to generate a control signal to change visual effects of the pointing object based on an amount of rotation of the wheel button, and to transmit control the communicator the control signal to the external device.

The remote controller apparatus may further include a ball sensor configured to extract movement tracks of a ball based on a rotation direction and an amount of rotation of the ball.

The controller may be further configured to control the communicator to transmit information regarding messages generated according to the extracted movement tracks of the ball to the external device and control the external device to display the messages.

The remote controller apparatus may further include a display.

The controller may be further configured to control the display to display a user interface screen for selecting whether to automatically change the operating mode according to the preset event.

According to one or exemplary embodiments, there is provided a control method of a remote controller apparatus configured to support a plurality of operating modes, the control method including: sensing a movement of the remote controller apparatus; determining position information corresponding to the movement of the remote controller apparatus; controlling a movement of a pointing object displayed on an external device based on the position information; and changing the operating mode of the remote controller apparatus in response to a preset event occurring while the remote controller apparatus operates, wherein the determining the position information includes determining the position information corresponding to the movement of the remote controller apparatus with a first method when the remote controller apparatus operates in a first operating mode among the plurality of operating modes, and determining the position information corresponding to the movement of the remote controller apparatus with a second method when the remote controller apparatus operates in a second operating mode among the plurality of operating modes.

The preset event may include at least one of an event in which a tilting degree of the remote controller apparatus is changed and an event in which an infrared light emitted from an infrared sensor provided on the remote controller apparatus is not sensed by the infrared sensor.

The first method is an absolute coordinate method and the second method a relative coordinate method.

The absolute coordinate method may include coordinates corresponding to the position of the pointing object based on mapped coordinates on a screen provided on the external device.

The relative coordinate method may include calculating an amount of the motion of the pointing object based on a current position of the pointing object. determining The first operating mode may be a pointing device mode, and the controlling may include controlling the movement of the pointing object so that the pointing object is moved toward one of the mapped coordinates on the screen when the remote controller device operates in the pointing device mode.

The second operating mode may be a mouse device mode, and the controlling may include controlling the movement of the pointing object according to an amount of the motion of the remote controller apparatus corresponding to the position information when the remote controller device operates in the mouse device mode.

The control method may further include: generating, in response to the pointing object being moved to coordinates outside the mapped coordinates on the screen, a control signal to perform a preset function; and transmitting the generated control signal to the external device.

The control method may further include: generating a control signal to change visual effects of the pointing object based on an amount of rotation of a wheel button of the remote controller apparatus; and transmitting the generated control signal to the external device.

The control method may further include: extracting movement tracks of a ball provided on the remote controller apparatus, based on a rotation direction and an amount of rotation of the ball; transmitting information regarding messages generated according to the extracted movement tracks of the ball to the external device; and displaying the messages on the external device.

The control method may further include: displaying a user interface screen for selecting whether to automatically change the operating mode according to the preset event.

According to one or exemplary embodiments, there is provided a remote controller apparatus including: a transceiver configured to communicate with an external device; a sensor configured to sense a movement of the remote control; and a controller configured to determine position information corresponding to the movement of the remote control with a first method while the remote control operates in a first operating mode, determine the position information corresponding to the movement of the remote control with a second method while the remote control operates in a second operating mode different from the first operating mode, control the transceiver to transmit the position information to the external device, and control the operating mode of the remote control in response to a change in a use environment of the remote control.

The controller may be further configured to determine the position information corresponding to the movement of the remote controller apparatus based on an absolute coordinate system while remote controller apparatus operates in the first operating mode, and determine the position information corresponding to the movement of the remote controller apparatus based on a relative coordinate system when the remote controller apparatus operates in the second operating mode.

The absolute coordinate system may be based on coordinates mapped to a screen provided on the external device.

The relative coordinate system may be based on an amount of the motion of the remote control and a current position of a pointing object displayed on the screen.

The controller may be further configured to control the remote control to operate in the first operating mode when the remote control is disposed on a flat surface, and control the remote control to operate in the second operating mode when the remote control is used lifted in the air.

According to various exemplary embodiments, usability of the remote controller apparatus is increased and user convenience is enhanced, as the remote controller apparatus can change operating modes in accordance with a use environment.

BRIEF DESCRIPTION OF THE DRAWINGS

The above and/or other aspects will be more apparent by describing certain exemplary embodiments with reference to the accompanying drawings, in which:

FIG. 11 is a flowchart describing a control method of a remote controller apparatus which supports a plurality of operating modes according to an exemplary embodiment.

DETAILED DESCRIPTION OF EXEMPLARY EMBODIMENTS

Figure 1:
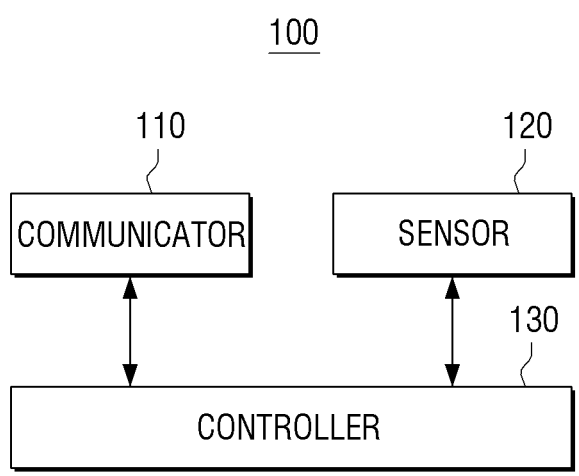
FIG. 1 is a block diagram of a remote controller apparatus according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of one or more exemplary embodiments. Accordingly, it is apparent that one or more exemplary embodiments can be carried out without those specifically defined matters. Also, well-known functions or constructions are not described in detail since they would obscure the disclosure with unnecessary detail.

FIG. 1 is a block diagram of a remote controller apparatus according to an exemplary embodiment.

Referring to FIG. 1, the remote controller apparatus 100, i.e., a remote controller, a remote control, or a remote control device, includes a communicator 110, i.e., a transmitter or a transceiver, a sensor 120, and a controller 130. Herein, the remote controller apparatus 100 may be implemented as various types of electronic devices such as remote controllers, pointing devices, or smart phones, which are configured to control a display apparatus.

Further, the remote controller apparatus 100 may support a plurality of operating modes, and, when a use environment changes, may change the operating modes based on the changed use environment. Specific operating modes will be described below.

The communicator 110 may perform communication with an external device. Herein, the external device may display a pointing object. The pointing object may include an indicator to indicate objects, such as pointer, a cursor or an arrow which is displayed on the screen provided on the external device.

The communicator 110 may perform communication with the external device by using various communication methods such as, wired/wireless local area network (LAN), WAN, Ethernet, Bluetooth, Zigbee, universal serial bus (USB), IEEE 1394, or WiFi. To this end, the communicator 110 may include chips or input ports corresponding to the respective communication methods. For example, when the communication is performed according to the wired LAN method, the communicator 110 may include a wired LAN card and an input port.

The sensor 120 may sense a movement of the remote controller apparatus 100. Specifically, the sensor 120 may include one or more of an infrared sensor, a gyro sensor, an acceleration sensor, and a tilt sensor, and sense a movement of the remote controller apparatus 100 with the included sensors.

Further, when the operating mode of the remote controller apparatus 100 is changed in response to a preset event during operation of the remote controller apparatus 100, the controller 130 may control the movement status, i.e., movement, of the pointing object by calculating position information corresponding to the movement of the remote controller apparatus 100 with a different method.

Specifically, while the remote controller apparatus 100 is in operation, that is, while the remote controller apparatus 100 is controlling the movement of the pointing object displayed on the external device, the controller 130 may change the operating mode of the remote controller apparatus 100 in response to a preset event.

Herein, the preset event may include at least one of an event in which the tilting degree of the remote controller apparatus 100 is changed, and an event in which the infrared light emitted from the infrared sensor provided on the remote controller apparatus 100 is not sensed by the infrared sensor. One or more events will be described in greater detail below by referring to FIGS. 2 and 3.

Figure 2:
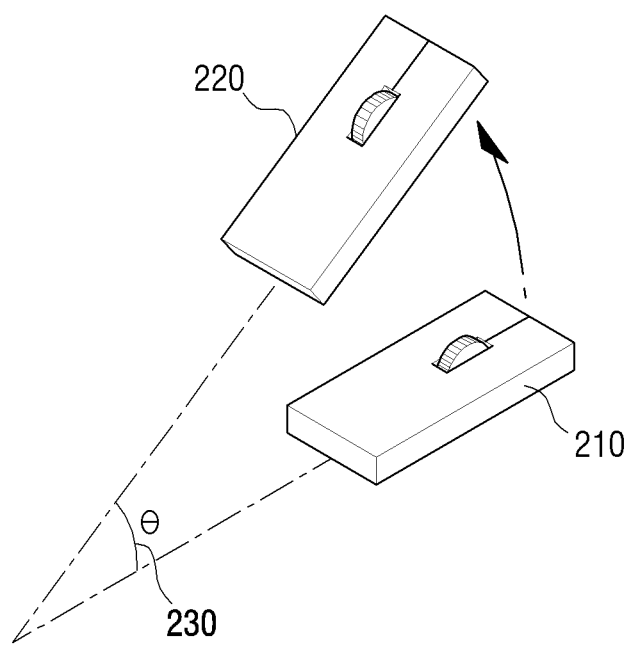
FIGS. 2 and 3 illustrate a remote controller apparatus in which an operating mode is changed according to one or more exemplary embodiments.
Figure 3:
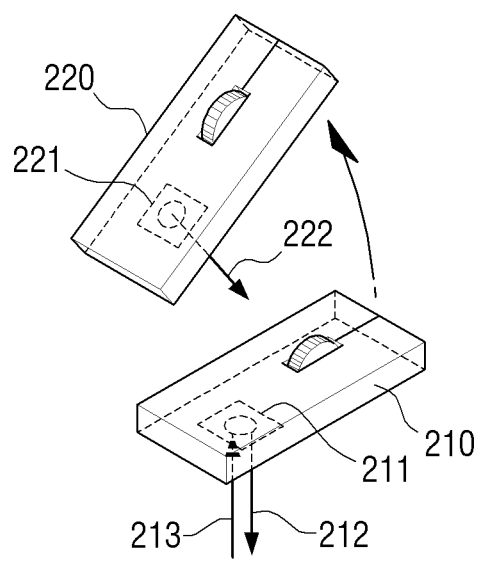

FIGS. 2 and 3 illustrate the remote controller apparatus in which the operating mode is changed according to an exemplary embodiment.

FIG. 2 illustrates the remote controller apparatus 100 provided which a wheel button, for use as both a mouse device and a pointing device. As illustrated, the remote controller apparatus 100 may be in a state 210 in which the remote controller apparatus 100 is placed on a flat surface and a state 220 in which the remote controller apparatus 100 is held up in the air and tilted.

Herein, the remote controller apparatus 100 may operate as a mouse device in the state 210 in which the apparatus is placed on a flat surface, and as a pointing device in the state 220 in which the apparatus is held up in the air and tilted.

Further, the tilting degree may be 0 degrees with reference to the flat surface in the state 210 in which the remote controller apparatus 100 is placed on the flat surface, and θ degrees 230 with reference to the flat surface in the state 220 in which the remote controller apparatus 100 is held up in the air and tilted.

Therefore, the controller 130 may determine that a preset event has occurred, when a change in the tilting degree of the remote controller apparatus 100 is sensed through a gyro sensor or a tilt sensor provided on or in the remote controller apparatus 100, and change the operating mode based on the change in the tilting degree.

Specifically, the controller 130 may change the operating mode to a mouse device mode or a pointing device mode based on the change in the tilting degree. However, the changeable operating modes may not be limited to the above examples only. Accordingly, the operating modes may be changed to various modes according to various user settings.

Referring to FIG. 3, in the state 210 in which the remote controller apparatus 100 is placed on the flat surface, infrared light 212 emitted from the infrared sensor 211 provided on the remote controller apparatus 100 may arrive at the surface and be reflected, and reflected infrared light 213 may be received at the infrared sensor 211. Accordingly, the controller 130 may determine the movement of the remote controller apparatus 100 sensing the reflected infrared light 213 being received at the reflected infrared light 213.

In the state 220 in which the remote controller apparatus 100 is held up in the air and tilted, the infrared light 222 emitted from the infrared sensor 221 provided on the remote controller apparatus 100 may not arrive at the surface. Further, even when the infrared light arrives at the surface, the reflected infrared light 223 may not be sensed by the infrared sensor 221, for example, because of a weak intensity.

Therefore, when the infrared light emitted from the infrared sensor provided on the remote controller apparatus 100 is received at the infrared sensor, the controller 130 may determine that the remote controller apparatus 100 is in the state 210 of being placed on the flat surface, and, thus, operate in the mouse operating mode. Further, when the infrared light emitted from the infrared sensor provided on the remote controller apparatus 100 is not sensed by the infrared sensor, the controller 130 may determine that the remote controller apparatus 100 is in the state 220 of being held up in the air and tilted, and thus operate in the pointing device mode.

Further, the controller 130 may control the movement status of the pointing object by calculating position information corresponding to the movement of the remote controller apparatus 100 with a different method, while changing the operating mode of the remote controller apparatus 100 in response to a preset event including, for example, the tilting degree of the remote controller apparatus 100 being changed, and the infrared light emitted from the infrared sensor provided on the remote controller apparatus not being received at the infrared sensor.

When the operating mode is changed, the controller 130 may calculate the position information corresponding to the movement of the remote controller apparatus with either an absolute coordinate method or a relative coordinate method. The absolute coordinate method calculates coordinates corresponding to a position of the pointing object based on the coordinates mapped on the screen provided on an external device, and the relative coordinate method calculates an amount of the motion of the pointing object based on a current position of the pointing object.

The absolute coordinate method may be based on coordinates mapped to a screen provided on the external device. The relative coordinate method may be based on a relative coordinate system based on an amount of the motion of the remote control and a current position of a pointing object displayed on the screen.

Figure 4:
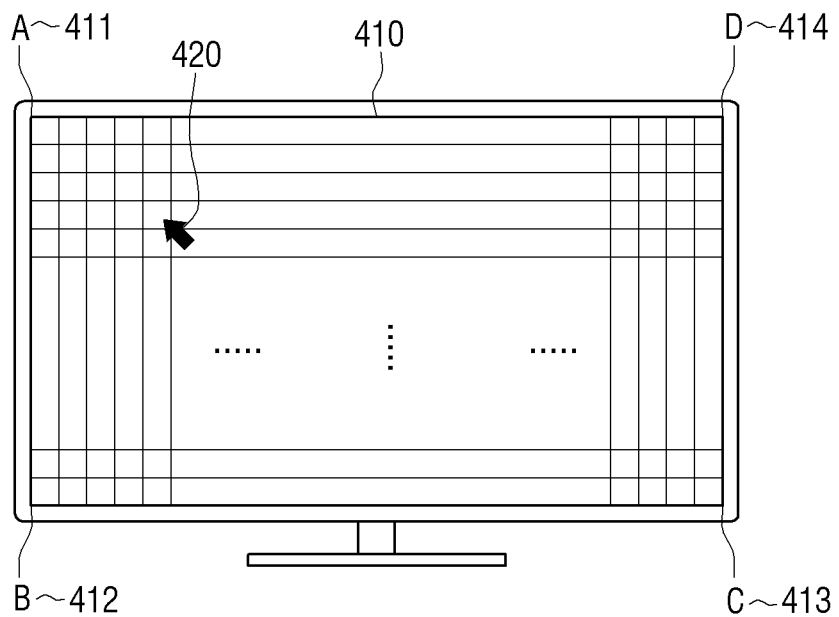
FIG. 4 is a view provided to explain an absolute coordinate method according to an exemplary embodiment.
Figure 5:
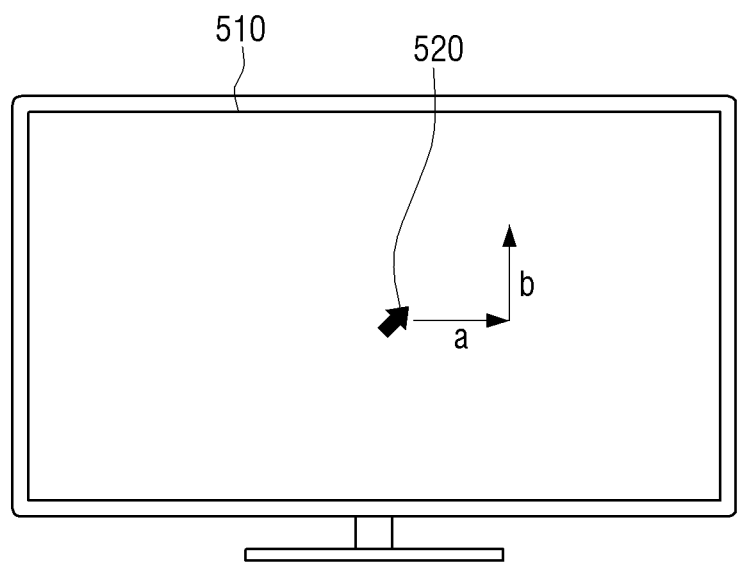
FIG. 5 is a view provided to explain a relative coordinate method according to an exemplary embodiment.
Figure 5:
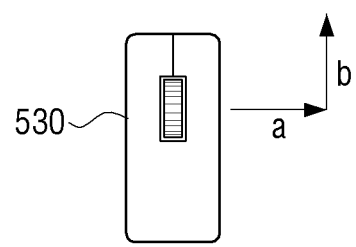

Referring to FIGS. 4 and 5, the absolute coordinate method and the relative coordinate method will be described in greater detail below.

FIG. 4 is a view provided to explain the absolute coordinate method according to an exemplary embodiment.

Referring to FIG. 4, the external device 400 (i.e., display apparatus 400) displaying a pointing object 420 thereon is illustrated. A display 410 provided on the display apparatus 400 may display the pointing object 420.

Herein, the coordinates may be mapped respectively based on vertices A, B, C, D (411, 412, 413, 414) of the display 410.

For example, when it is assumed that the vertex A (411) is mapped with (0, 0), that the vertex B (412) is mapped with (0, 1000), that the vertex C (413) is mapped with (1000, 1000), and that the vertex D (414) is mapped with (1000, 0), the coordinates from (0, 0) to (1000, 1000) may be mapped on the display 410 including the vertices A, B, C, D (411, 412, 413, 414).

Further, coordinates corresponding to the position of the pointing object 420 displayed currently on the display 410 may be indicated correctly with numbers. For example, the coordinate corresponding to the position of the pointing object 420 may be specified with one coordinate set such as (20, 20) among a plurality of coordinates mapped on the display 410.

Further, while the remote controller apparatus 100 controls movement status of the pointing object 420, in response to inputting the coordinate values (200, 200) according to an operation of a user, the remote controller apparatus 100 may control the pointing object 420 to be moved toward a point corresponding to the coordinates (200, 200) among the coordinates from (0, 0) to (1000, 1000) mapped on the display 410.

As explained above with reference to FIG. 4, the absolute coordinate method calculates coordinates corresponding to the position of the pointing object based on the coordinates mapped on the screen provided on the external apparatus.

FIG. 5 is a view provided to explain the relative coordinate method according to an exemplary embodiment.

Referring to FIG. 5, an external device 500 (i.e., display apparatus 500) displaying a pointing object 520 thereon and a remote controller apparatus 530 are illustrated. Further, a display 510 provided on the display apparatus 500 may display the pointing object 520.

Rather than controlling the movement of the pointing object 520 by using the coordinates mapped on the display 510 (see FIG. 4), the remote controller apparatus 530 of FIG. 5 may control the movement of the pointing object 520 by calculating an amount of motion of the pointing object 520 based on a current position of the pointing object 520.

For example, the remote controller apparatus 530 may control the movement of the pointing object 520 based on a current position of the pointing object 520 displayed on the display 510. As illustrated in FIG. 5, when the remote controller apparatus 530 moves toward the right direction as much as "a" and toward the upper direction as much as "b", the amount of the motion of the remote controller apparatus 530 may be (a, b). Thus, according to the amount of the motion of the remote controller apparatus 530, the pointing object 520 may be moved toward the right direction as much as "a" and toward the upper direction as much as "b".

One difference between the absolute coordinate method of FIG. 4 and the relative coordinate method of FIG. 5 will be described below. When the numbers (100, 100) are input to the remote controller apparatus using the absolute coordinate method, the remote controller apparatus using the absolute coordinate method may move the pointing object to be placed on coordinate corresponding to (100, 100) among the coordinates mapped on the display.

When the numbers (100, 100) are input to the remote controller apparatus using the relative coordinate method, the remote controller apparatus using the relative coordinate method may move the pointing object as much as (100, 100) toward a specific direction based on a current position of the pointing object. For example, when the numbers input to the remote controller apparatus using the relative coordinate method are 100 toward the right direction and 100 toward the upper direction, the remote controller apparatus using the relative coordinate method may move the pointing object as much as (100, 100) toward the right direction and the upper direction based on a current position of the pointing object.

The controller 130 may change the operating mode of the remote controller apparatus in response to a preset event. When the changed operating mode is a pointing device mode, position information corresponding to the movement of the remote controller apparatus 100 may be calculated through the absolute coordinate method as described in FIG. 4 and movement status of the pointing object may be controlled so that the pointing object is moved toward one of the mapped coordinates on the screen.

Thus, when the remote controller apparatus 100 operates in the pointing device mode, the pointing object displayed on the screen may be positioned on the direction pointed by the remote controller apparatus 100. The controller 130 may calculate position information corresponding to the movement of the remote controller apparatus 100 with the absolute coordinate method, and move the pointing object toward one of the mapped coordinates on the screen.

Further, when the controller 130 changes the operating mode of the remote controller apparatus in response to a preset event to a mouse device mode, the controller 130 may calculate position information corresponding to the movement of the remote controller apparatus 100 through the relative coordinate method as described in FIG. 5, and control the movement status of the pointing object according to an amount of the motion of the remote controller apparatus corresponding to the calculated position information.

Thus, as illustrated in FIG. 5, when the remote controller apparatus 530 operates in the mouse device mode, the pointing object displayed on the screen may be moved on the screen in response to the movement direction and amount of the motion of the remote controller apparatus 530 based on a current position of the pointing object.

When the pointing object is moved toward the coordinates other than the mapped coordinates on the screen, the controller 130 may generate a control signal to perform a preset function and transmit the control signal to the external device.

Figure 6:
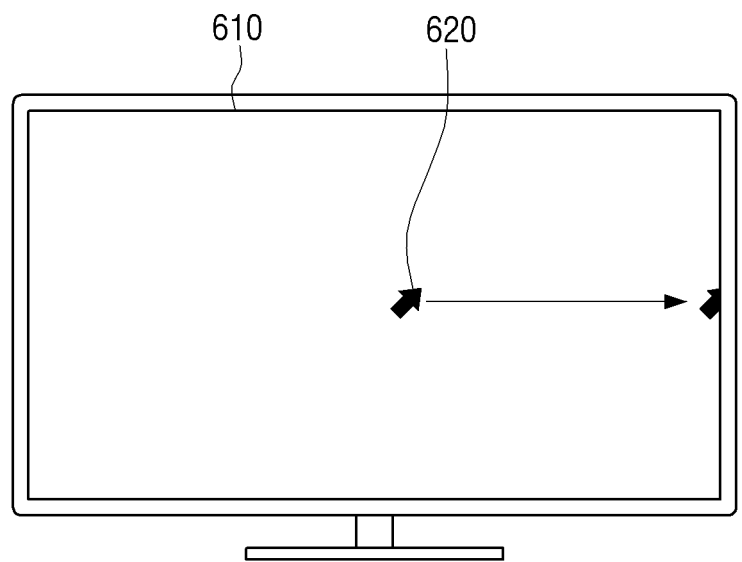
FIG. 6 illustrates a case of pointing to a margin area of a screen according to an exemplary embodiment.
Figure 6:
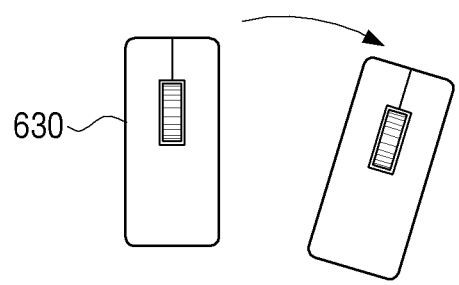

FIG. 6 illustrates an example in which margin area of the screen is pointed to according to an exemplary embodiment.

Referring to FIG. 6, the remote controller apparatus 630 may operate in one of the pointing device mode and the mouse device mode, and control the movement of the pointing object 620 displayed on the display 610 of the display apparatus 600.

When the remote controller apparatus 630 moves the pointing object 620 out of the area on the display 610 to the right end, the controller 130 may generate a control signal to perform a preset function and transmit the control signal to the display apparatus 600.

Specifically, when the pointing object 620 is moved toward coordinates other than the mapped coordinates on the display 610, the display apparatus 600 may transmit the information indicating that the pointing object 620 is out of the mapped coordinate area on the display 610 to the remote controller apparatus 630, and upon receiving such information at the remote controller apparatus 630, the controller 130 may generate a control signal to perform a preset function in the display apparatus 600 and transmit the control signal to the display apparatus 600.

For example, the preset function may include a return-to-previous screen, next screen playback, slideshow, screen turn off, or other various functions that may be excused according to user setting.

Accordingly, a user may control the movement of the pointing object 620 displayed on the display apparatus 600 by using the remote controller apparatus 630, and may perform the other functions such as previous screen return or slideshow.

Figure 7:
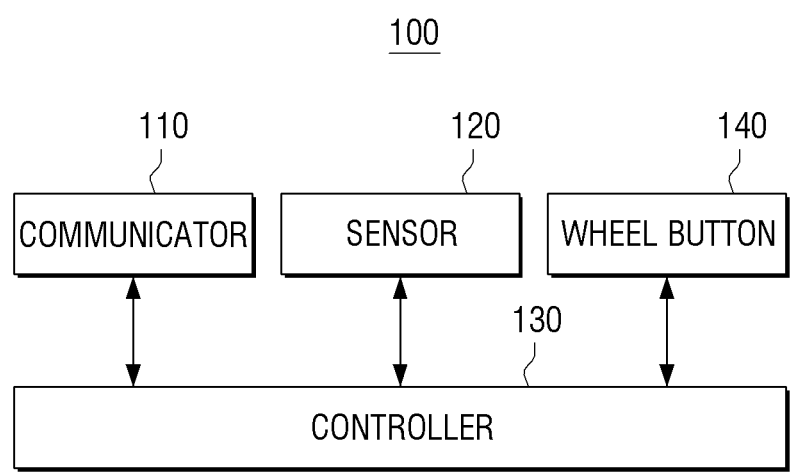
FIG. 7 illustrates a configuration of a remote controller apparatus according to another exemplary embodiment.

FIG. 7 illustrates a configuration of a remote controller apparatus according to another exemplary embodiment.

Referring to FIG. 7, the remote controller apparatus 100 includes a communicator 110, a sensor 120, a controller 130, and a wheel button 140. The communicator 110 and the sensor 120 may be similar to those described above.

The wheel button 140 may be used in changing the visual effects of the pointing object. Thus, the controller 130 may generate a control signal to change the visual effects of the pointing object based on an amount of rotation of the wheel button 140 caused by an operation of a user, and transmit the control signal to the external device.

Figure 8:
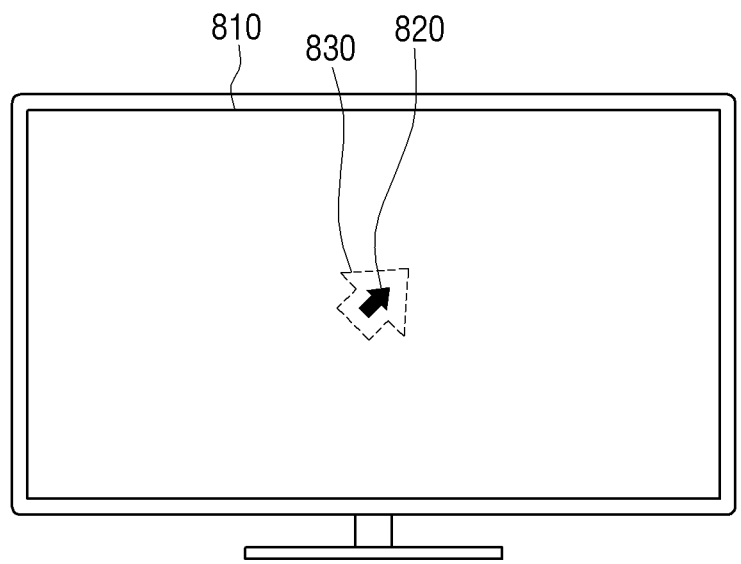
FIG. 8 illustrates changes in visual effects of a pointing object according to an exemplary embodiment.
Figure 8:
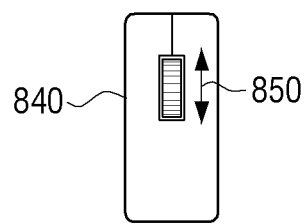

FIG. 8 illustrates the pointing object with changed visual effects according to an exemplary embodiment.

Referring to FIG. 8, when the wheel button 140 provided on the remote controller apparatus 840 rotates, the control signal generated in response may be transmitted to the display apparatus 800. Accordingly, the visual effects may be changed according to an amount of rotation of the wheel button 140 regarding the pointing object 820 displayed on the display 810 provided on the display apparatus 800. In FIG. 8, a size of the pointing object 820 may be changed according to an amount of rotation of the wheel button 140, so that a bigger pointing object 830 is displayed.

Although FIG. 8 only illustrates that the size of the pointing object 820 may be changed according to an amount of rotation of the wheel button 140, other exemplary embodiments are possible. For example, a transparency of the pointing object 820 may be adjusted, or a color of the pointing object 820 may be adjusted. Additionally, a depth of the pointing object 820 may be adjusted. Accordingly, various visual effects may be changed in response to the rotation of the wheel button 140.

Further, in generating a control signal to change the visual effects of the pointing object 820 based on an amount of rotation of the wheel button 140, the controller 130 may slightly increase the size of the pointing object 820 when an amount of rotation of the wheel button 140 is small, while further increasing the size of the pointing object 820 when an amount of rotation of the wheel button 140 is large. Further, the controller 130 may generate a control signal to reduce the size of the pointing object 820 when the wheel button 140 is rotated to the opposite directions. The above process may be uniformly applied to the process of adjusting transparency, color, or depth of the pointing object 820.

Figure 9:
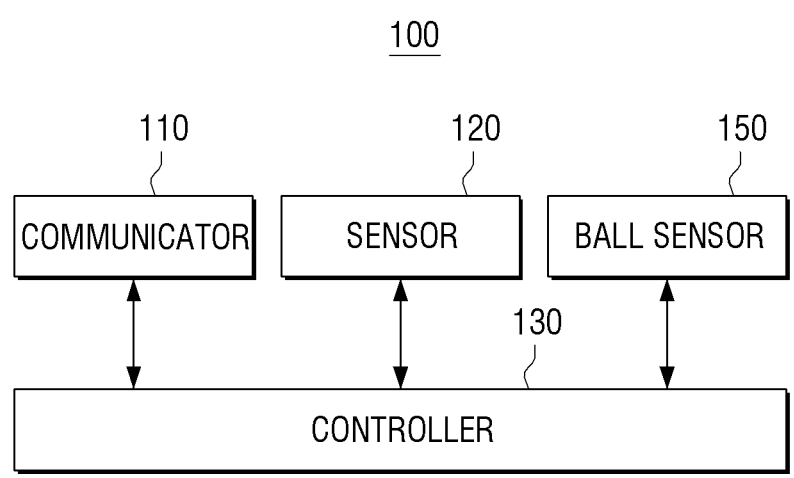
FIG. 9 illustrates a configuration of the remote controller apparatus according to another exemplary embodiment.

FIG. 9 illustrates a configuration of a remote controller apparatus according to another exemplary embodiment.

Referring to FIG. 9, the remote controller apparatus 100 includes a communicator 110, a sensor 120, a controller 130 and a ball sensor 150. The communicator 110 and the sensor 120 may be similar to those described above.

The ball sensor 150 may extract movement tracks regarding the ball based on a rotating direction and an amount of rotation of the ball.

Further, the controller 130 may transmit information regarding messages generated according to the extracted movement tracks regarding the ball to the external device so that the external device displays the messages.

Specifically, when a user grabs the remote controller apparatus 100 with his hand and operates the same as if he or she is writing with a pen, the ball sensor 150 provided on the remote controller apparatus 100 may extract the movement tracks of the ball based on rotating direction and amount of the rotation of the ball which is moved on the surface.

Further, the controller 130 may obtain the information regarding messages, and transmit the obtained information to the external device so that the external device displays the messages.

This operating mode of the remote controller apparatus 100 may be defined to be the 'writing mode', in which when a user grabs the remote controller apparatus 100 like a pen and when the ball of the ball sensor 150 is touched on the surface, the controller 130 may change the operating mode into the writing mode and perform the above described operation.

Figure 10:
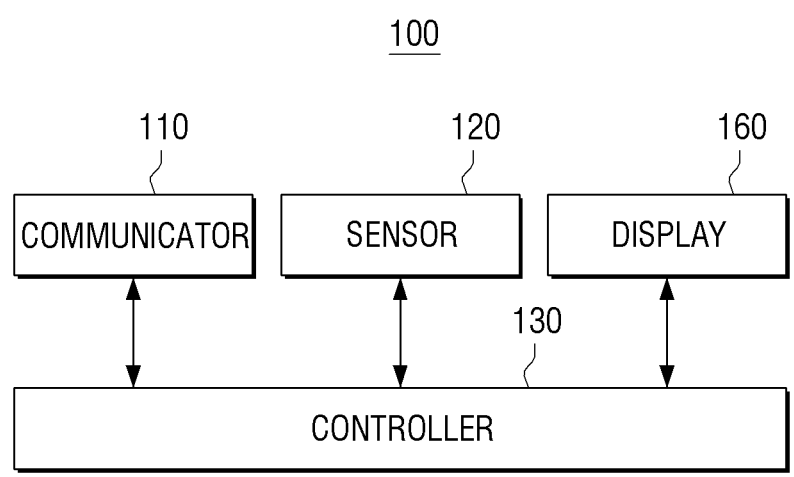
FIG. 10 illustrates a configuration of the remote controller apparatus according to another exemplary embodiment.

FIG. 10 illustrates a configuration of a remote controller apparatus according to yet another exemplary embodiment.

Referring to FIG. 10, the remote controller apparatus 100 includes a communicator 110, a sensor 120, a controller 130 and a display 160. The communicator 110 and the sensor 120 may be similar to those described above.

The display 160 may display a setting screen such as a user interface screen.

Further, the controller 130 may control the display 160 to display the user interface screen. Whether or not to automatically change the operating mode of the remote controller apparatus 100 in response to a preset event may be selected through the user interface screen.

Therefore, when a user establishes that the operating mode of the remote controller apparatus 100 is to automatically change on the user interface screen, the controller 130 may automatically change the operating mode of the remote controller apparatus 100 in response to a preset event such as a change in the tilting degree of the remote controller apparatus 100 or infrared light emitted from the infrared sensor not being sensed by the infrared sensor.

However, when a user establishes that the operating mode of the remote controller apparatus 100 is to not be changed automatically, the controller 130 may keep the current operating mode without changing the operating mode of the remote controller apparatus 100.

The user interface screen may be implemented as a graphical user interface (GUI) or an on screen display (OSD).

FIG. 11 is a flowchart provided to explain a control method of the remote controller apparatus supporting a plurality of operating modes according to an exemplary embodiment.

According to the method illustrated in FIG. 11, communication may be performed with an external device displaying the pointing object, at S1110.

At S1120, the movement of the remote controller apparatus may be sensed.

At S1130, movement status of the pointing object may be controlled based on the movement of the remote controller apparatus.

Further, at S1140, position information corresponding to the movement of the remote controller apparatus may be calculated with a different method when the operating mode of the remote controller apparatus is changed in response to a preset event.

Herein, the preset event may include at least one of the tilting degree of the remote controller apparatus being changed and infrared light not being received at the infrared sensor.

At S1150, movement status of the pointing object may be controlled based on the calculated position information with the different method.

Further, when the operating mode is changed, the calculating may calculate position information corresponding to the movement of the remote controller apparatus through one of the absolute coordinate method in which coordinate corresponding to the position of the pointing object is calculated based on the mapped coordinates on the screen provided on the external device, and the relative coordinate method in which an amount of the motion of the pointing object is calculated based on a current position of the pointing object.

Further, the calculating may calculate position information corresponding to the movement of the remote controller apparatus with the absolute coordinate method when the operating mode is a pointing device mode. The controlling of the movement status of the pointing object based on the calculated position information with a different method may control the movement status of the pointing object so as to move the pointing object toward one of the mapped coordinates on the screen.

Further, the calculating may calculate position information corresponding to the movement of the remote controller apparatus with the relative coordinate method when the operating mode is a mouse device mode. The controlling movement status of the pointing object based on the calculated position information with a different method may control the movement status of the pointing object according to an amount of the motion of the remote controller apparatus corresponding to the calculated position information.

The control method of the remote controller apparatus according to an exemplary embodiment may additionally include generating a control signal to perform a preset function and transmitting the control signal to the external device when the pointing object is to be moved to coordinates other than the mapped coordinates on the screen.

Further, the control method of the remote controller apparatus according to an exemplary embodiment may include generating a control signal to change the visual effects of the pointing object based on an amount of rotation of a wheel button which is moved according to an operation of a user and transmitting the control signal to the external device.

Further, the control method of the remote controller apparatus according to an exemplary embodiment may include extracting the movement tracks of a ball based on a rotating direction and an amount of the rotation of the ball provided on the remote controller apparatus and transmitting the information regarding messages generated according to the extracted movement tracks of the ball to the external device so that the external device displays the messages.

Further, the control method according to an exemplary embodiment may include displaying a user interface screen, through which whether or not to automatically change the operating mode in response to a preset event may be selected.

A non-transitory computer readable recording medium storing programs which are executable by a computer or processor for consecutively performing the control method may be provided.

For example, the non-transitory computer readable recording medium may store a program which implements operations of performing communication with an external device displaying the pointing object, sensing the movement of the remote controller apparatus, controlling movement status of the pointing object based on the movement of the remote controller apparatus, calculating position information corresponding to the movement of the remote controller apparatus with a different method when the operating mode of the remote controller apparatus is changed in response to a preset event, and controlling the movement status of the pointing object based on the calculated position information with the different method.

The non-transitory computer readable recording medium may refer to a medium which stores data semi-permanently and can be read by devices, rather than a medium which stores data temporarily such as register, cache, or memory. Specifically, the above various applications or programs may be stored and provided in a non-transitory computer readable recording medium such as a compact disc (CD), a digital versatile disc (DVD), a hard disk, a Blu-ray disk, a Universal Serial Bus (USB) flash drive, a memory card, or a read only memory (ROM).

Further, communication between respective components of the remote controller apparatus may be performed through the bus. Further, each device may include a processor such as a central processing unit (CPU) or a microprocessor for performing the various operations mentioned above.

The foregoing exemplary embodiments and advantages are merely exemplary and are not to be construed as limiting the exemplary embodiments. The present teaching can be readily applied to other types of apparatuses. Also, the description of one or more exemplary embodiments is intended to be illustrative, and not to limit the scope of the claims and their equivalents.

What is claimed is:

1. A remote controller apparatus configured to operate in a plurality of operating modes, the remote controller apparatus comprising:

a communicator;
a sensor; and
a processor configured to:
   control the sensor to emit an infrared light,
   operate, based on the infrared light not being received through the sensor, in a first operating mode from among the plurality of operating modes, and operate, based on the infrared light being received through the sensor, in a second operating mode from among the plurality of operating modes,
   obtain position information corresponding to a movement of the remote controller apparatus sensed by the sensor, the position information being obtained according to a first coordinate system based on the remote controller apparatus operating in the first operating mode, and according to a second coordinate system different from the first coordinate system based on the remote controller apparatus operating in the second operating mode, and
   control a movement of a pointing object displayed on a screen of an external device based on the position information,
wherein the first coordinate system is an absolute coordinate system and the second coordinate system is a relative coordinate system, and
wherein the processor is further configured to:
   obtain the position information according to the absolute coordinate system when the remote controller apparatus operates in the first operating mode by obtaining coordinates corresponding to a position of the pointing object displayed on the screen, based on mapped coordinates on the screen of the external device, and
   obtain the position information according to the relative coordinate system by obtaining an amount of the movement of the remote controller sensed by the sensor.

2. The remote controller apparatus of claim 1, wherein the sensor comprises:
   a first sensor, which is an infrared sensor configured to emit the infrared light and sense the infrared light reflected from a surface; and
   a second sensor, which is a gyro sensor configured to detect a change in a tilting degree of the remote controller apparatus.

3. The remote controller apparatus of claim 1, wherein the first operating mode is a pointing device mode, and
   wherein the processor is further configured to control the movement of the pointing object displayed on the screen so that the pointing object is moved to one of the mapped coordinates on the screen based on the remote controller apparatus operating in the pointing device mode.

4. The remote controller apparatus of claim 1, wherein the second operating mode is a mouse device mode, and
   wherein the processor is further configured to control the movement of the pointing object displayed on the screen according to the amount of the movement of the remote controller apparatus corresponding to the position information based on the remote controller apparatus operating in the mouse device mode.

5. The remote controller apparatus of claim 1, wherein the processor is further configured to generate a control signal to perform a preset function and control the communicator to transmit the control signal to the external device based on the pointing object being moved to coordinates outside the mapped coordinates on the screen.

6. The remote controller apparatus of claim 1, further comprising a wheel button configured to be rotatable,
   wherein the processor is further configured to generate a control signal to change visual effects of the pointing object based on an amount of rotation of the wheel button, and to control the communicator to transmit the control signal to the external device.

7. The remote controller apparatus of claim 1, further comprising a ball sensor configured to extract movement tracks of a ball based on a rotation direction and an amount of rotation of the ball,
   wherein the processor is further configured to control the communicator to transmit information regarding messages generated according to the extracted movement tracks of the ball to the external device and control the external device to display the messages on the screen.

8. The remote controller apparatus of claim 1, further comprising a display,
   wherein the processor is further configured to control the external device to display on the screen a user interface for selecting whether to automatically change the operating mode according to a preset event.

9. A control method of a remote controller apparatus configured to operate in a plurality of operating modes, the control method comprising:
   emitting an infrared light by a sensor of the remote controller apparatus;
   operating, based on the infrared light not being received through the sensor, in a first operating mode from among the plurality of operating modes, and operating, based on the infrared light being received through the sensor, in a second operating mode from among the plurality of operating modes;
   obtaining position information corresponding to a movement of the remote controller apparatus according to a first coordinate system based on the remote controller apparatus operating in the first operating mode, and obtaining the position information according to a second coordinate system based on the remote controller apparatus operating in the second operating mode; and
   controlling a movement of a pointing object displayed on a screen of an external device based on the obtained position information,
   wherein the first coordinate system is an absolute coordinate system and the second coordinate system is a relative coordinate system,
   wherein obtaining the position information according to the absolute coordinate system comprises obtaining coordinates corresponding to a position of the pointing object displayed on the screen of the external device, based on mapped coordinates on the screen of the external device, and
   wherein obtaining the position information according to the relative coordinate system comprises obtaining an amount of the movement of the remote controller, sensed by the sensor.

10. The control method of claim 9, wherein the first operating mode is a pointing device mode, and
   wherein the controlling comprises controlling the movement of the pointing object displayed on the screen so that the pointing object is moved toward one of the mapped coordinates on the screen based on the remote controller apparatus operating in the pointing device mode.

11. The control method of claim 10, further comprising:

generating, based on the pointing object being moved to coordinates outside the mapped coordinates on the screen, a control signal to perform a preset function; and transmitting the control signal to the external device.

12. The control method of claim 9, wherein the second operating mode is a mouse device mode, and wherein the controlling comprises controlling the movement of the pointing object displayed on the screen according to the amount of the movement of the remote controller apparatus corresponding to the position information based on the remote controller apparatus operating in the mouse device mode.

13. The control method of claim 9, further comprising:

generating a control signal to change visual effects of the pointing object based on an amount of rotation of a wheel button of the remote controller apparatus; and transmitting the control signal to the external device.

14. The control method of claim 9, further comprising:

extracting movement tracks of a ball provided on the remote controller apparatus, based on a rotation direction and an amount of rotation of the ball;

transmitting information regarding messages generated according to the extracted movement tracks of the ball to the external device; and displaying the messages on the screen of the external device.

15. The control method of claim 9, further comprising displaying on the screen a user interface for selecting whether to automatically change the operating mode according to a preset event.

\* \* \* \* \*